Sept. 1, 1964 J. F. BUDNICK 3,146,982
UNIVERSAL SWIVEL BEAM CLAMP
Filed Dec. 21, 1961 2 Sheets-Sheet 1
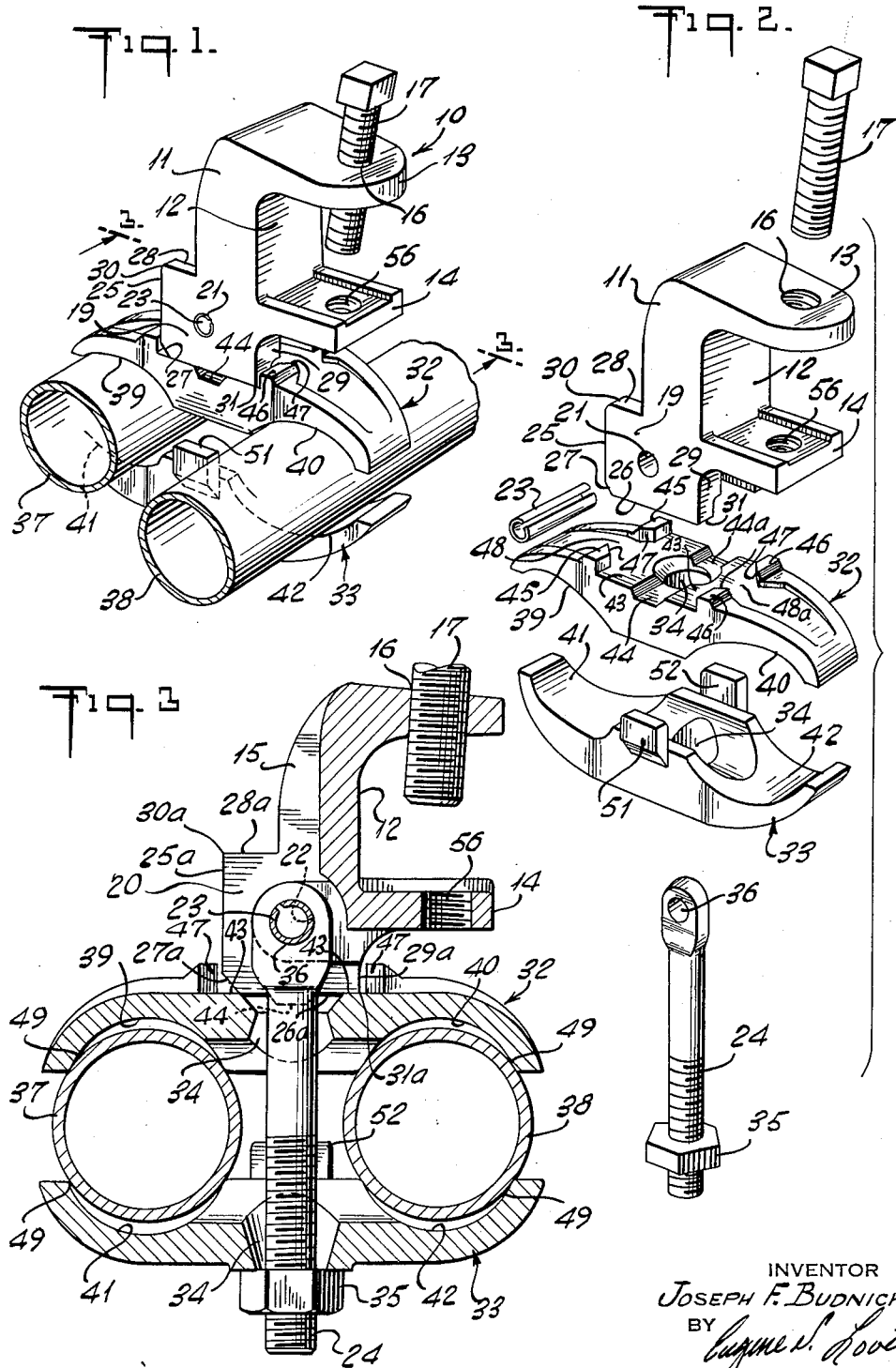
INVENTOR
JOSEPH F. BUDNICK
BY
ATTORNEY

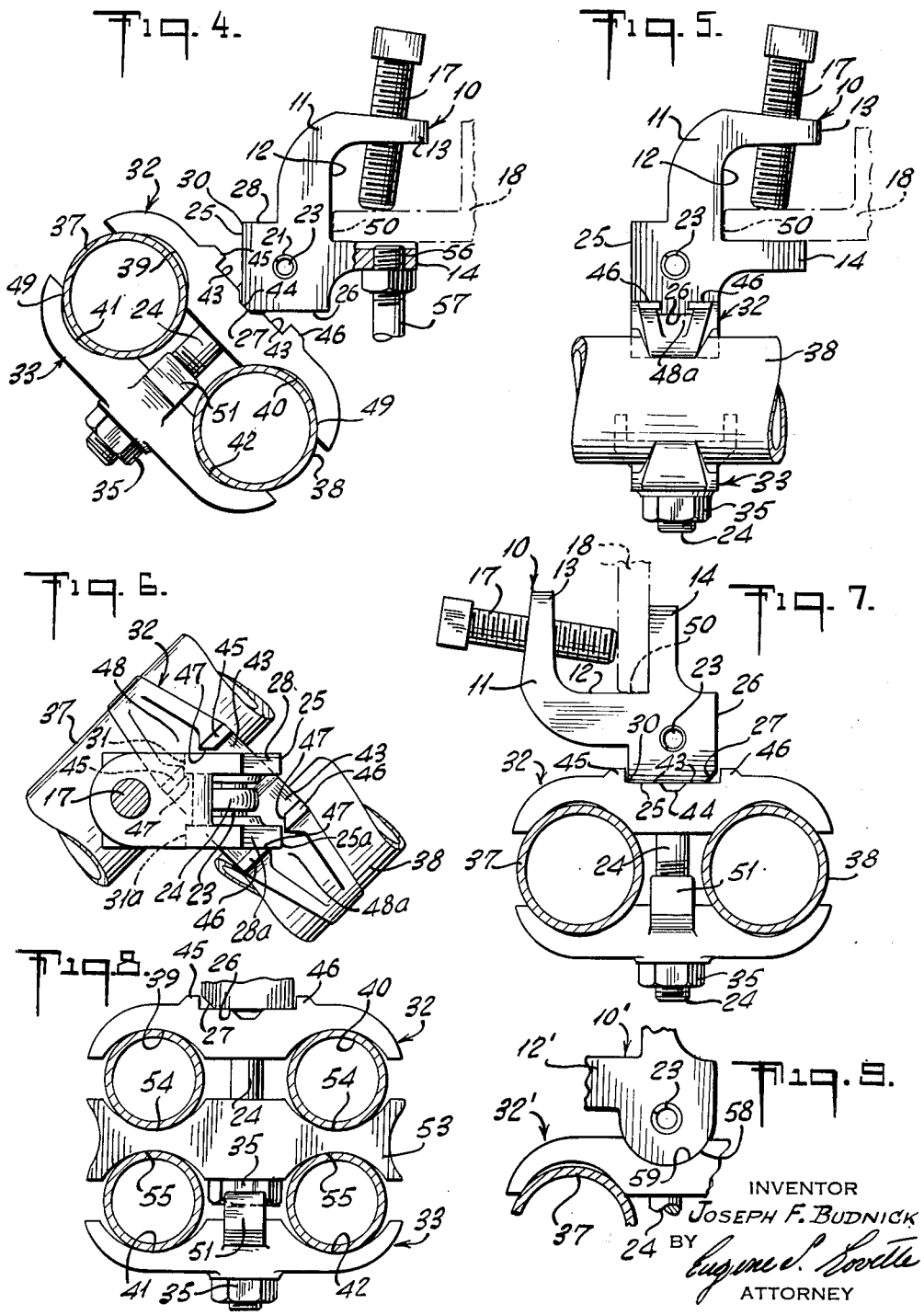

United States Patent Office 3,146,982
Patented Sept. 1, 1964

3,146,982
UNIVERSAL SWIVEL BEAM CLAMP
Joseph F. Budnick, Bellerose, N.Y., assignor to Electrical Fittings Corporation, East Farmingdale, N.Y., a corporation of New York
Filed Dec. 21, 1961, Ser. No. 161,226
16 Claims. (Cl. 248—68)

This invention relates to a universal swivel clamp for holding one or more tubular members, such as pipe, electrical conduit raceways, electrical cable or the like to a reference beam and, in particular, refers to a single clamp structure equipped to provide a multiple of clamp arrangements in any one of a number of planes and various angles to effect 90 degrees, 45 degree edge or parallel clamp arrangements.

It is the principal object of this invention to provide a structurally compact and rugged clamp for fastening one or more tubular members, such as pipe, rigid walled and electrical conduit and raceways, electrical cable or other like axial members, such as plumbing or sprinkler piping, to a reference beam, such as a building structure, whereby the clamp is equipped to be swiveled to any one or more of a number of planes and angles so as to provide a single clamp structure capable of a 90 degree, edge or parallel clamp arrangement, that is to say, whereby a single clamp structure can satisfy any one of the many clamping requirements normally encountered during a building installation requiring correspondingly individual clamps for each application.

It is a further object of this invention to provide a clamp for fastening tubular members or the like as contemplated herein to a reference beam structure, wherein the clamp is characterized by comparative economy and simplicity with respect to fabrication and use.

Further objects and advantages will become apparent from the following description of the invention taken in conjunction with the figures, in which:

FIG. 1 is an elevational view in perspective of one embodiment of a universal swivel clamp in accordance with the principles of the invention;

FIG. 2 is an exploded view of the components constituting such clamp;

FIG. 3 is an elevational view in section taken along line 3—3 of FIG. 1;

FIG. 4 is an elevational view of the clamp preset to clamp conduit to a reference beam wherein the clamp is tilted 45 degrees;

FIG. 5 is an elevational view illustrating the clamp preset wherein the axes of the conduit and reference beam are rotated 90 degrees apart;

FIG. 6 is a top view of the clamp illustrating a preset clamp position with the axis of the clamp body turned a multiple of 45 degrees from that illustrated in FIGS. 1 and 3;

FIG. 7 shows another preset arrangement allowed by the clamp;

FIG. 8 illustrates a further modification wherein more than two conduits are held by the clamp; and FIG. 9 illustrates a modified version of the clamp.

Reference is now made to FIGS. 1, 2 and 3 for a detailed description of a universal swivel clamp 10 in accordance with the principles of the invention. Clamp 10 includes a C clamp body 11. Body 11 has a lengthwise and relatively vertical web 12 and a pair of parallel spaced arms 13, 14 projecting laterally from the same side of web 12. Web 12 is reenforced by side flanges 15. Arm 13 includes a threaded hole 16 for carrying a threaded rod or screw 17. In accordance with known practices, clamp 10 is attached firmly to a building reference beam 18 depicted in broken outline in FIGS. 4, 5 and 7 by mounting C clamp over reference beam 18 for clamping same tight by screw 17 as illustrated herein. The lower portion of clamp body 11 includes parallel and laterally spaced apart side walls 19, 20 which are continuations of re-enforcing flanges 15. Side walls 19, 20 include aligned openings 21, 22 for holding a formed split sleeve 23 inserted therein. Sleeve 23 is made from a flat thin metal blank rolled into the shape of a hollow split rod, and is held in its illustrated position by a press fit. The upper end of an eyebolt 24 extends upwardly between the inner sides of side walls 19, 20 and is pivotally supported from sleeve 23 to swing freely between side walls 19, 20. Eyebolt 24 is provided with a hole 36 of suitable size for pivotally mounting same over sleeve 23 after the sleeve 23 is inserted into one of the wall holes 21 or 22 and before it is inserted into the second of such wall holes.

Body wall 19 has first and second straight edges 25, 26 at a right angle relationship with respect to each other. Edges 25, 26 joint at a common corner 27. Side wall 19 also has relatively shorter third and fourth straight edges or shoulders 28, 29. The wall edge 28 forms a common corner 30 with the first wall edge 25, and the fourth wall edge 29 forms a common corner 31 with the second wall edge 26. The last two corners 30, 31 are in diagonal relationship with respect to each other in the plane of wall 19, and the first corner 27 is in between the diagonal corners 30, 31. Body wall 20 is shaped similar to wall 19, note FIG. 3, and thus includes first and second straight edges 25a, 26a at a right angle relationship with respect to each other and joined at a corner 27a. Wall 20 also includes the relatively shorter third and fourth straight edges 28a, 29a forming diagonally shaped corners 30a, 31a in the plane of wall 20, wherein edges 28a, 29a join with correlated ones of the straight edges 25a, 26a. It will be understood that one edge of each side wall 19 and 20 is in parallel coplanar relationship with respect to the correspondingly like edge of the other side wall. From a side elevational view, it is seen that the first and second edges of each side wall are substantially equal in length.

In the embodiment of FIGS. 1 through 3, a pair of mutually coacting clamp members 32, 33 are provided with aligned central openings 34 for mounting same over eyebolt 24 below clamp body 11. A nut 35 threaded to the lower end of bolt 24 holds the assembly together. As seen from the figures, nut 35 serves to close together top and bottom members 32, 33 in mutually tight relationship for clamping a pair of first and second tubular pipes 37, 38 or other like bodies therebetween. Clamp members 32, 33 are designed to hold two tubular members 37, 38, one on each side of bolt 24. The clamping action provided by nut 35 also serves to nest the lower end of body 11 tightly against top clamp member 32.

Top clamp member 32 has a pair of first and second curved jaw faces 39, 40 on opposite sides of bolt 24. Jaw faces 39, 40 confront a pair of mutually disposed and complementary shaped first and second jaw faces 41, 42 in bottom clamp member 33. Each jaw face of upper member 32 is equipped to coact with an individual jaw face of lower member 33 for the purpose of gripping opposite portions of individual tubular members 37, 38, whereby the gripped tubular members 37, 38 are clamped to reference beam 18. Upper member 32 has socket means provided by a relatively flat surface 43 confronting the depending body walls 19, 20. Flat surface 43 extends between opposite sides of clamp member 32 for nesting against selected ones of the wall edges 25, 25a or 26, 26a when body 11 is clamped against top member 32. Flat surface 43 is recessed by diametrically opposite dwells 44, 44a extending from central opening 34 to the opposite sides of clamp member 32. Confronting upright walls 45, 46 are provided along opposite sides of flat surface 43. Walls 45, 46 extend lengthwise between opposite sides of member 32. Each wall 45, 46 is split intermediate its ends by angled faces 47 to form diverging slots 48, 48a, wherein slots 48, 48a narrow as the radial distance from central opening 34 increases.

The effectiveness of the clamping grip provided by members 32, 33 may be increased by selecting jaw faces of radius less than the radius of the tubular member OD. This provides a biting grip along the points 49 where jaw members 32, 33 make contact wtih the surface portions of tubular members 37, 38, and also permits clamping of conduits of different diametrical sizes. The laterally spaced apart distance between upright walls 45, 46, as seen in FIGS. 3 and 7, is slightly greater than the length of wall edges 25, 25a and 26, 26a, and also slightly greater than the width of body 11 to permit body 11 to nest against flat surface 43 for the various clamping arrangements achieved by clamp 10 and as illustrated in FIGS. 1, 5 and 7. For example, in the clamping arrangement depicted by FIG. 1, wall edges 26 and 26a are clamped against flat surface 43 whereas wall edges 25, 25a and 29, 29a extend vertically and substantially contiguous with correlated ones of upright walls 45, 46. In FIG. 7, body 11 is turned 90 degrees about the axis of sleeve 23 from its position shown in FIG. 1, whereby wall edges 25, 25a now bear or nest against flat surface 43 as body edges 28, 28a and 26, 26a extend vertically in contiguous relationship between correlated ones of upright walls 45, 46. On the other hand, in the clamping arrangement of FIG. 5, it is understood that the opposite outer sides of body walls 19, 20 nest in contiguous relationship within the upright walls 45, 46. The foregoing structural arrangement of having body walls 19, 20 nest between upright walls 45, 46 holds body 11 nested against flat surface 43 and prevents turning of body 11 about the vertical axis as nut 35 is being tightened up along bolt 24. For applications where free turning of clamp body 11 is desired, a clamp member, such as 33, may be used in place of top clamp member 32 and clamp member 32 may be used as the bottom clamp.

One of the basic advantages of the instant invention is that it provides a single clamp structure which affords a multiple of clamp arrangements in various planes and angles. For example, clamp 10 may be swiveled to any one of a number of planes and to various angles to effect a 90 degree, edge, parallel or intermediate angle clamp arrangements. FIGS. 1 and 3 illustrate the relative positions of the clamp components for one version of parallel clamping. Although reference beam 18 is not shown in FIGS. 1 and 3, it will be understood that the lengthwise axis of the reference beam extends parallel with the axes of the pair of tubular members 37, 38 held by clamp 10. In this instance, C clamp body 11 is attached to reference beam 18 as depicted in FIG. 4, i.e., beam 18 is clamped between clamping bolt 17 and arm 14 with the outer edge 50 of beam 18 contiguous to clamp web 12. In the embodiment of FIGS. 1 and 3, reference beam 18 is to the right of the vertical axis, i.e., lengthwise dimension of web 12. In this embodiment, body web 12 is substantially aligned with the axis of bolt 24. If body 11 is turned 180 degrees about the vertical axis from the position shown in FIG. 1, clamp 10 affords a second parallel clamping arrangement, that is to say, for the situation where reference beam 18 is to the left of clamp body 11. Clamping is completed by mounting clamp members 32, 33 around tubular members 37, 38 and then by tightening up 35 on bolt 24 to cause clamp members 32, 33 to be brought together in mutually tight relationship against the two tubular members 37, 38. This action also causes wall edges 26, 26a to nest tightly against flat surface 43.

A 90 degree clamp arrangement is depicted in FIG. 5. In this instance, clamp body 11 is rotated plus or minus 90 degress about the vertical axis from its position shown in FIG. .1, and then clamped to reference beam 18. For the illustrated 90 degree clamp arrangement, the longitudinal or lengthwise axis of reference beam 18 extends into and out of the plane of the paper and in right angle relationship to the axes of tubular members 37, 38. FIG. 5 shows beam 18 on the right hand side of the vertical axis. By rotating clamp body 11 180 degrees about the vertical axis from its position shown in FIG. 5, members 37, 38 may be clamped to a beam 18 on the left side of the vertical axis. The axis of reference beam 18 will still be into and out of the paper and perpendicular to the parallel axes of tubular members 37, 38. In all the embodiments depicted or represented by FIGS. 1, 3 and 5, wall edges 26 and 26a are selected to nest against flat surface 43.

FIG. 7 illustrates a right angle clamp arrangement and is essentially a situation where C clamp body 11 is turned 90 degress about the axis of sleeve 23 from its positions shown in FIG. 1 or 5. In FIG. 7, it will be recognized that the lengthwise axis of reference beam 18 is into and out of the paper and is parallel to the axes of the pair of tubular members 37, 38. The equivalent clamping arrangement is achieved by turning clamp body 11 180 degrees about the vertical axis from that shown in FIG. 7. In the latter instance, the head of clamping screw 17 is on the right side of reference beam 18 rather than the left side as shown in FIG. 7. Clamp 10 also achieves right angle clamping wherein the reference beam axis is perpendicular to the axes of tubular members 37, 38. This means turning clamp body 11 plus or minus 90 degrees about the vertical axis from the position shown in FIG. 7, wherein it will be understood that the longitudinal axis of beam now extends laterally across the paper. In this latter arrangement, the outer sides of walls 19, 20 of clamp body 11 are in contiguous relationship between the opposed upright walls 45, 46. For the arrangement actually illustrated in FIG. 7, wall edges 28, 28a and 26, 26a are disposed vertically upright in contiguous relationship to correlated ones of the opposed upright walls 45, 46. For the four clamping arrangements described herein with respect to FIG. 7, that is to say, right angle clamping arrangements, it will be understood that wall edges 25 and 25a are selected to nest against flat surface 43.

FIG. 4 illustrates an edge clamping arrangement wherein the vertical axis of clamp body 11 is tilted 45 degrees with respect to the lengthwise axis of supporting bolt 24. In this arrangement, body 11 is selectively positioned whereby the common corner portions 27, 27a of walls 19, 20 nest in dwells 44, 44a, respectively, to assure a firm and steady nesting against top members 32 without wabble. For this reason, corners 27, 27a are provided with slight flats. Similarly, the bases of dwells 44, 44a are flat and the sides of dwells 44, 44a diverge outwardly so that corner portions 27, 27a of walls 19, 20 nest in complementary shaped dwells 44, 44a. In this clamp arrangement, no other portion of clamp body 11 engages or nests against top member 32 except for the corner portions of walls 19, 20 nesting in dwells 44, 44a. FIG. 4 shows reference beam 18 on the right hand side of clamp body 11. A similar arrangement for clamping to a reference beam 18 on the left hand side is afforded by the structure 10 by turning clamp body 11 180 degrees about the axis of bolt 24 from its position illustrated in FIG. 4.

FIG. 6 depicts a clamping arrangement wherein clamp body 11 is swiveled about the vertical axis to occupy selected ones of individual positions plus or minus 45 degrees from the position shown in FIG. 1 and plus or minus 135 degrees from its position depicted in FIG. 1. The actual clamping arrangement shown in FIG. 6 is one wherein clamp body 11 is swiveled minus 135 degrees from its position shown in FIG. 1. For this set position, wall edges 26 and 26a nest against flat surface 43 while corner 27a extends into slot 48a, whereas the diagonally opposite corner 31 of the other wall 20 extends into slot 48. It will be understood that in the flat plane containing wall edges 26 and 26a, corners 27 and 31a are in diagonal relationship and corners 27a and 31 also are in diagonal relationship. In the flat plane defined by wall edges 25, 25a, diagonal relationship exists between corners 30 and 27a and also betwen corners 30a and 27. The three other positions with wall edges 26, 26a nested against flat surface 43 are ones defined by corner 31 extending into slot 48a while corner 27a extends into slot 48; the set position of minus 45 degrees involves corner 31a in slot 48a and corner 27 in slot 48; and the plus 135 degree position calls for corner 27 in slot 48a while corner 31a is in slot 48. It will be understood that the structural arrangement of having diagonally opposite corners, such as 31–27a and 31a–27, extending into the correlated slots 48, 48a as described herein assists in locking clamp body 11 to hold its set position. Four clamping positions of equivalent nature are also achieved by turning clamp body 11 90 degrees about sleeve 23 and repeating the foregoing $\pm 45$ degrees and $\pm 135$ degrees arrangements, however this time wall edges 25, 25a are set to nest against flat surface 43 and diagonal corners 27–30a and 27a–30 are caused to extend into slots 48, 48a.

The foregoing figures illustrate means for clamping a pair of tubular pipes 37, 38, electrical conduit and raceways, or other like structures to a reference beam 18. The same clamping structure 10 may be used to clamp only one pipe or like member to a reference beam, in which case one pair of clamping jaws on either side of supporting bolt 24 will be void of a tubular member. Furthermore, the clamp structure may be used to hold relatively soft sheath electrical cable as well as relatively hard or rigid wall tubular members or any combination thereof. Bottom member 33 is provided with a pair of upright lugs 51, 52 which extend across and straddle the opposite upper sides of top member 32 to maintain both members 32, 33 in relatively parallel alignment to aid in rotating both conduit clamp members 32, 33 together while the clamp is being adjusted before conduit members 37, 38 are inserted between such clamp members.

FIG. 8 illustrates the technique and embodiment for clamping more than two tubular members or cables to a reference beam 18 with one clamp structure 10. In this instance, clamp members 32, 33 are separated by an intermediate member 53 which has curved jaw faces 54 along its top surface for coaction with jaw faces 39, 40 and two similar jaw faces 55 along its bottom surface for coacting with jaw faces 41, 42. Clamp member 53 has a central opening for mounting same over supporting bolt 24. In FIG. 6, the clamp jaws 39 . . . 42 and 54, 55 make contact at diametrically opposite portions of the OD of the pipes held therebetween to illustrate that a single clamp 10 may be used to hold conduit of various OD diameters in multiple grouping. In the preferred embodiment, a nut 35 is used behind each pair of pipes.

It is seen that arm 13 is inclined with the horizontal whereby clamping bolt 17 is slightly off set angularly with respect to the vertical axis. This is best seen in FIGS. 3, 4, 5 and 6. The angular off set serves to resist pull out of C clamp body 11 from reference beam 18 after C clamp body 11 is tightly clamped thereto. For example, in FIG. 4 a pull out on C clamp body 11 to the left tends to pivot clamping screw 17 and correspondingly turns arm 13 connected therewith counterclockwise. This action causes the lower end of bolt 17 to bite harder into reference beam 18 at the point of contact therebetween. Arm 14 is provided with a threaded hole 56 for carrying a threaded drop rod 57. Drop rod 57 may be used to support or hang other work pieces therefrom.

FIG. 9 illustrates a modification of the clamp in accordance with the principles of the invention. In this instance, clamp 10' has a curve or substantially semi-circular bottom edge surface 58 in lieu of straight edges 25, 25a and 26, 26a. That is to say, the straight edges of embodiment 10 are replaced by circular edges. Similarly, the flat surface 43 in member 32 is replaced by a correspondingly curved surface 59 in top member 32'. The arrangement of FIG. 9 now provides greater steps of adjustability by reason of nesting a curved edge 58 in a curved seat 59.

It is intended that all matter contained in the above description or shown in the accompanying drawings shall be interpreted as illustrative and not in a limiting sense.

What is claimed is:

1. A universal swivel clamp for holding tubular piping or the like to a reference beam comprising, means including a clamp body for attachment to a reference beam, a pair of laterally spaced apart side walls depending from said body, each side wall having a pair of first and second straight edges at right angle relationship with each other and joined at a first common corner, one edge of each wall being in parallel relationship with respect to a correspondingly like edge of the other side wall, axial bolt means depending from said body, means pivotally supporting said bolt means with respect to said body, top and bottom clamp members carried in juxtaposed relationship by said bolt means for holding tubular piping therebetween, said top member having a socket equipped to interlock with individual pairs of corresponding edges of said walls, and nut means on said bolt means for closing together said top and bottom members in mutually tight relationship for clamping the piping therebetween and for nesting a selected pair of said corresponding wall edges tightly in said socket, whereby said clamped piping is held to said reference beam.

2. Apparatus as defined in claim 1 wherein, said top and bottom members have a central opening and said bolt means passing freely therethrough, each member having a curved jaw complementing a curved jaw of the other member on each side of said central openings, wherein the complementing clamp jaws form a tubular piping grip for clamping an individual tubular pipe on either side of said bolt means.

3. Apparatus as defined in claim 1 wherein, said top member has opposed upright walls defining two sides of said socket, each of said upright walls being slotted intermediate its ends, each body side wall also having third and fourth straight edges, the third straight edge of each side wall being joined with a first straight edge of such side wall at a second common corner, the fourth straight edge of each side wall being joined with the second straight edge of such side wall at a third common corner, said second and third common corners of each side wall being in substantially diagonally spaced relationship and the first common corner joining said first and second straight edges thereof being intermediate said diagonal corners, said body being selectively positioned at a 45 degree angle with respect to the axis of said axial bolt means upon rotationally positioning said body, whereby a first common corner of one body side wall engages said one upright wall slot as one diagonal corner of the other side wall engages the other upright wall slot.

4. A universal swivel clamp for holding tubular piping or the like to a reference beam comprising, means including a clamp body for attachment to a reference beam, a pair of laterally spaced apart side walls depending from said body, each side wall having a pair of straight edges at right angle relationship with each other and joined at a corner, one edge of each wall being in parallel relationship with respect to a correspondingly like edge of the other side wall, axial bolt means depending from said body, means pivotally supporting said bolt means with respect to said body, top and bottom clamp members carried in juxtaposed relationship by said bolt means for holding said tubular piping therebetween, said top member having a relatively flat surface, said top member having in said flat surface a recess between opposite sides of said top member, said body being equipped to be selectively positioned at an angle of about 45 degrees with respect to the plane of said flat surface by nesting the pair of said corners of said body side walls in said recess, and nut means on said bolt means for closing together said top and bottom members in mutually tight relationship for clamping the piping therebetween and for nesting said body side wall corners tightly in said flat surface recess, whereby said clamp piping is held to said reference beam.

5. A universal swivel clamp for holding tubular pipe means or the like to a reference beam comprising, means including a clamp body for attachment in fixed relationship to a reference beam, said body having a plurality of individual surface portions at a predetermined angular relationship with respect to each other, axial bolt means depending from said body, means pivotally supporting said bolt means with respect to said body, first and second clamp members carried in juxtaposed relationship on said bolt means for holding tubular pipe means therebetween, one of said members having a surface equipped to nest against selected ones of said individual surface portions, and means on said bolt means for closing together said first and second members in mutually tight relationship for clamping said tubular pipe means therebetween and for nesting said surface of said one member tightly against the selected one of said body surface portions where said clamped pipe means is held in fixed relationship to said reference beam.

6. A universal swivel clamp for holding tubular piping or the like to a reference beam comprising, means including a clamp body for attachment to a reference beam, a pair of laterally spaced apart side walls depending from said clamp body, each side wall having a plurality of surfaces wherein each side wall surface of said plurality being at a given angular relationship with respect to another of said surfaces of such side wall, individual ones of said surfaces of each side wall being in parallel relationship with respect to a correspondingly like surface of the other side wall, axial means depending from said body, clamp jaw means carried by said axial means for holding tubular piping therebetween, said clamp jaw means having a socket equipped for locking register with selected pairs of parallel surfaces of said side walls, and fastening means associated with said axial means for closing said clamp jaw means in mutually tight relationship for clamping the piping therebetween and also for tightening the selected pair of said parallel surfaces of said side walls in locked register in said socket, whereby said clamped piping is held to said reference beam, said clamp body defining a longitudinal axis, the plurality of said surfaces of each side wall including first and second edges having adjacent ends forming a common corner, the other ends of the edges of each side wall defining corners in diagonal relationship with respect to each other, said socket having oppositely spaced locking means intermediate the sides of said clamp jaw means with which selected ones of said corners are engageable, said clamp body being selectively positioned about its longitudinal axis for clamping to a reference beam with a common corner of one body side wall engaging one of said socket locking means while a diagonal corner of the other body side wall engages the other socket locking means.

7. A universal swivel clamp for holding tubular pipe or the like to a reference beam comprising, means including a clamp body for attachment to a reference beam, said body having spaced apart side walls, each side wall having surfaces at a given angular relationship with respect to each other, individual ones of said surfaces of one side wall being in parallel relationship with respect to a correspondingly like surface of the other side wall, axial support means, clamp jaw means carried on said axial support means for holding tubular pipe in clamped relation, said axial support means being pivotally atttached to said body and extending from said body through said clamp jaw means, said clamp jaw means having socket means for register with selected ones of parallel side wall surfaces, said clamp jaw means being positionally rotatable about the axis of said axial support means prior to clamping said swivel clamp and being selectively preset for clamping in one of said plurality of positions, and fastening means cooperating with said axial support means for closing said clamp jaw means in mutually tight relationship for clamping said pipe and for clamping selected ones of said side wall surfaces tightly in locked register with said socket means, wherein said pipe is clamped in fixed relationship to a reference beam, said clamp jaw means socket having a relatively flat surface and spaced apart opposed upright walls bordering the sides of said flat surface, said upright walls being in substantially contiguous interlocked relationship with opposed surfaces of said body side walls when a selected pair of side wall surfaces are nested tightly against said flat surface.

8. Apparatus as defined in claim 7, the plurality of said surfaces of each side wall including first and second edges having adjacent ends forming a common corner, the other ends of the edges of each side wall defining corners in diagonal relationship with respect to each other, the upright walls of said socket having oppositely spaced locking means intermediate the sides of said clamp jaw means with which selected ones of said corners are engageable, said clamp body being selectively positioned about the axis of said axial means for clamping to a reference beam with a common corner of one body side wall engaging one of said socket locking means while a diagonal corner of the other body side wall engages the other socket locking means.

9. A universal swivel clamp for holding tubular pipe or the like to a reference beam comprising, means including a clamp body for attachment to a reference beam, said body having surfaces at predetermined angular relationship with respect to each other, axial support means, first and second clamp members carried on said axial support means for holding tubular pipe in clamped relation, said axial support means being pivotally attached to said body and extending from said body through said first and second clamp members, said first clamp member having socket means for providing locked register with selected ones of said body surfaces nesting in said socket means, said first and second clamp members being postionally rotatable relative to said axial support means about the axis thereof prior to clamping said swivel clamp, said first and second clamp members being selectively preset for clamping in one of a plurality of positions about the axis of said axial support means, and fastening means cooperating with said axial support means for closing together said first and second clamp members in mutually tight relationship for clamping said pipe and for clamping tightly said first member and said clamp body in locked registered relationship, wherein said pipe is clamped in fixed relationship to a reference beam.

10. A clamp as defined in claim 9, wherein said first and second clamp members being supported on said axial support means between said fastening means and the point of attachment of said axial support means to said body.

11. A clamp as defined in claim 9, wherein said axial support means and said clamp body having respective lengthwise axes, the selection of certain of said clamp body surfaces for clamping with said first clamp member socket means results in alignment of said lengthwise axes upon clamping the swivel clamp, other of said body surfaces being at a 90° angular relationship with respect to said certain body surfaces, the selection of said other body surfaces for clamping with said first clamp member socket means results in a 90° angular relationship between the axes of said clamp body and said axial means upon clamping the swivel clamp.

12. A universal swivel clamp for holding tubular pipe or the like to a reference beam comprising, means including a clamp body for attachment to a reference beam, said body having spaced apart side walls, each side wall having a plurality of straight edges at a given angular relationship with respect to each other, individual ones of said edges of one side wall being in parallel relationship with respect to a corresponding like edge of the other side wall, axial support means, first and second clamp members carried on said axial support means for holding tubular pipe in clamped relation, said axial support means being pivotally attached to said body and extending from said body through said first and second clamp members, said first clamp member having socket means for providing locked register with selected ones of said parallel edges nesting in said socket means, said first and second clamp members being positionally rotatable about the axis of said axial support means prior to clamping said swivel clamp, said first and second clamp members being selectively preset for clamping in one of a plurality of positions about the axis of said axial support means, and fastening means cooperating with said axial support means for closing together said first and second clamp members in mutually tight relationship for clamping said pipe and for clamping a selected pair of body parallel edges tightly in locked register with said socket means, wherein said pipe is clamped in fixed relationship to a reference beam.

13. A clamp as defined in claim 12, wherein each side wall having first and second straight edges at a right angle relationship with each other and joined at a corner, said first straight edges of said side walls being in parallel relationship, said second straight edges of said side walls being in parallel relationship, said clamp body and said axial support means defining respective lengthwise axes, said clamp body being selectively positioned for parallel and right angle clamping with respect to said reference beam, the lengthwise axes of said clamp body and axial support means being aligned when the first straight edges of said walls register with said socket means to effect a parallel clamping arrangement, and the lengthwise axes of said clamp body and axial support means being displaced substantially at right angles with respect to each other when the second straight edges of said walls register with respect to said socket means to effect the aforesaid right angle clamping arrangement.

14. Apparatus as defined in claim 12 wherein, said socket means having a relatively flat surface and spaced apart opposed upright walls bordering the sides of said flat surface, said upright walls being in substantially contiguous interlocked relationship with opposed surfaces of said body side walls when a selected pair of side wall edges are clamped tightly against said flat surface.

15. A clamp as defined in claim 12, wherein said straight edges and said socket means having complementary interlocking coacting portions for permitting said clamp body to be rotationally preset for locked register about the axis of said axial support means relative to said first and second clamp members for any one of a plurality of positions, each of said positions being angularly spaced at least approximately ±45° from the next adjacent preset position.

16. Apparatus as defined in claim 15, said socket means having a relatively flat surface and spaced apart opposed upright walls bordering the sides of said flat surface, said upright walls being in substantially contiguous interlocked relationship with opposed surfaces of said body side walls when a selected pair of said straight edges thereof are clamped tightly against said flat surface.

References Cited in the file of this patent

UNITED STATES PATENTS

| 1,737,214 | Brown | Nov. 26, 1929 |
| 1,840,216 | Tormo | Jan. 5, 1932 |
| 1,888,342 | Anderson | Nov. 22, 1932 |
| 2,422,039 | Pritchard | June 10, 1947 |
| 2,868,485 | Friel | Jan. 13, 1950 |
| 3,023,989 | White | Mar. 6, 1962 |

FOREIGN PATENTS

| 599,241 | Germany | June 28, 1934 |